United States Patent
Park et al.

(10) Patent No.: US 10,854,878 B2
(45) Date of Patent: Dec. 1, 2020

(54) LITHIUM COBALT COMPOSITE OXIDE FOR LITHIUM SECONDARY BATTERY AND LITHIUM SECONDARY BATTERY INCLUDING POSITIVE ELECTRODE INCLUDING THE SAME

(71) Applicant: SAMSUNG SDI CO., LTD., Yongin-si (KR)

(72) Inventors: Young Jin Park, Yongin-si (KR); Chang Wook Kim, Yongin-si (KR); Eun Sung Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 15/662,987

(22) Filed: Jul. 28, 2017

(65) Prior Publication Data
US 2018/0040897 A1 Feb. 8, 2018

(30) Foreign Application Priority Data
Aug. 2, 2016 (KR) .................. 10-2016-0098449

(51) Int. Cl.
| | |
|---|---|
| *H01M 4/587* | (2010.01) |
| *H01M 4/525* | (2010.01) |
| *H01M 4/131* | (2010.01) |
| *H01M 4/505* | (2010.01) |
| *H01M 4/133* | (2010.01) |

(Continued)

(52) U.S. Cl.
CPC ........ *H01M 4/587* (2013.01); *C01G 45/1228* (2013.01); *C01G 51/42* (2013.01); *C01G 51/50* (2013.01); *C01G 53/50* (2013.01); *H01M 4/131* (2013.01); *H01M 4/133* (2013.01);
(Continued)

(58) Field of Classification Search
CPC ...... H01M 4/587; H01M 4/505; H01M 4/525; H01M 4/133; H01M 4/131; H01M 4/1228; C01G 45/1228
See application file for complete search history.

(56) References Cited

U.S. PATENT DOCUMENTS

| | | | |
|---|---|---|---|
| 7,608,363 | B2 | 10/2009 | Kinoshita et al. |
| 7,615,315 | B2 | 11/2009 | Tatsumi et al. |

(Continued)

FOREIGN PATENT DOCUMENTS

| | | |
|---|---|---|
| JP | 2004-079386 A | 3/2004 |
| JP | 2006-147191 A | 6/2006 |

(Continued)

OTHER PUBLICATIONS

Cheon, et al. "Effect of Binary Conductive Agents in LiCoO$_2$ Cathode on Performances of Lithium Ion Polymer Battery" Electrochimica Acta, vol. 46, Issue 4, (2000) pp. 599-605.
(Continued)

*Primary Examiner* — Osei K Amponsah
(74) *Attorney, Agent, or Firm* — Lee IP Law, P.C.

(57) ABSTRACT

A lithium cobalt composite oxide for a lithium secondary battery and a lithium secondary battery, the lithium cobalt composite oxide including a magnesium (Mg)-doped lithium cobalt composite oxide having an atomic ratio of Mg to cobalt (Co) of about 0.0035:1 to about 0.01:1, wherein the Mg-doped lithium cobalt composite oxide further includes fluorine (F).

17 Claims, 5 Drawing Sheets

(51) Int. Cl.
*C01G 51/00* (2006.01)
*C01G 45/12* (2006.01)
*C01G 53/00* (2006.01)

(52) U.S. Cl.
CPC .......... *H01M 4/505* (2013.01); *H01M 4/525* (2013.01); *C01P 2002/52* (2013.01)

(56) References Cited

U.S. PATENT DOCUMENTS

| | | | |
|---|---|---|---|
| 9,923,244 | B2 | 3/2018 | Takanashi et al. |
| 2005/0250013 | A1 | 11/2005 | Tatsumi et al. |
| 2006/0154146 | A1 | 7/2006 | Kawasato et al. |
| 2006/0222951 | A1* | 10/2006 | Tatsumi ................ C01G 51/42 429/231.95 |
| 2007/0254214 | A1 | 11/2007 | Horichi et al. |
| 2008/0076027 | A1* | 3/2008 | Saito ................ C01G 45/1228 429/231.1 |
| 2008/0076207 | A1* | 3/2008 | Yamano ................ H01L 21/561 438/108 |
| 2012/0034516 | A1 | 2/2012 | Koo et al. |
| 2013/0071661 | A1 | 3/2013 | Chen et al. |
| 2013/0071747 | A1 | 3/2013 | Chen et al. |
| 2017/0018808 | A1 | 1/2017 | Takanashi |

FOREIGN PATENT DOCUMENTS

| | | |
|---|---|---|
| KR | 10-2005-0057566 A | 6/2005 |
| KR | 2006-0028408 A | 3/2006 |
| KR | 10-2010-0052419 A | 5/2010 |
| KR | 10-2014-0016730 A | 2/2014 |
| KR | 10-1419097 B1 | 7/2014 |
| WO | WO 2015-136881 A1 | 9/2015 |
| WO | WO 2015136881 A | 9/2015 |

OTHER PUBLICATIONS

Extended European Search Report issued by the European Patent Office dated Dec. 15, 2017 in the examination of the European Patent Application No. 17 183 608.3.
Office Action issued by the European Patent Office dated Sep. 6, 2018 in the examination of the European Patent Application No. 17183608.3.
Office Action issued by the European Patent Office dated Sep. 19, 2019 in the examination of the European Patent Application No. 17183608.3.
EIC Search results from Julia Wang on Nov. 4, 2018 (2018).
EIC Search results from Brandon Burnette on Sep. 2, 2019 (2019).
European Search Report issued in EP 17183645,5 dated Dec. 15, 2017.
European Office action issued in EP 17183645.5 dated Sep. 6, 2019.
European Office action issued in EP 17183645.5 dated Sep. 19, 2019.
Office action issued in U.S. Appl. No. 15/662,725 dated Mar. 14, 2019.
Office action issued in U.S. Appl. No. 15/662,725 dated Sep. 16, 2019.
Office action issued in U.S. Appl. No, 15/662,725 dated Apr. 20, 2020.
U.S. Appl. No. 15/662,725, filed Jul. 28, 2017, V. Lynch.
U.S. Office Action received in co pending U.S. Appl. No. 15/662,725 dated Aug. 25, 2020.
Korean Office Action dated Jul. 1, 2020.

* cited by examiner

LITHIUM COBALT COMPOSITE OXIDE FOR LITHIUM SECONDARY BATTERY AND LITHIUM SECONDARY BATTERY INCLUDING POSITIVE ELECTRODE INCLUDING THE SAME

CROSS-REFERENCE TO RELATED APPLICATION

Korean Patent Application No. 10-2016-0098449, filed on Aug. 2, 2016, in the Korean Intellectual Property Office, and entitled: "Lithium Cobalt Composite Oxide for Lithium Secondary Battery and Lithium Secondary Battery Including Positive Electrode Including the Same," is incorporated by reference herein in its entirety.

BACKGROUND

1. Field

Embodiments relate to a lithium cobalt composite oxide for a lithium secondary battery and a lithium secondary battery including a positive electrode including the same.

2. Description of the Related Art

Lithium cobalt oxide ($LiCoO_2$) is widely used as a positive electrode active material of a lithium secondary battery. As lithium secondary batteries are widely used in portable information electronic devices as well as in motor-driven tools, automobile vehicles, and the like, safe, high-capacity lithium secondary batteries with high power output are in strong demand.

SUMMARY

Embodiments are directed to a lithium cobalt composite oxide for a lithium secondary battery and a lithium secondary battery including a positive electrode including the same.

The embodiments may be realized by providing a lithium cobalt composite oxide for a lithium secondary battery, the lithium cobalt composite oxide including a magnesium (Mg)-doped lithium cobalt composite oxide having an atomic ratio of Mg to cobalt (Co) of about 0.0035:1 to about 0.01:1, wherein the Mg-doped lithium cobalt composite oxide further includes fluorine (F).

An amount of F in the lithium cobalt composite oxide may be about 0.2 mol % to about 2 mol %, based on a total number of moles of the lithium cobalt composite oxide.

The F may be doped inside the Mg-doped lithium cobalt composite oxide.

The atomic ratio of Mg to Co may be about 0.005:1 to about 0.01:1.

An atomic ratio of a sum of atoms of Li and Mg to Co may be about 1.00:1 or less.

The lithium cobalt composite oxide may be a compound represented by Formula 1 below:
wherein, in Formula 1, 0<x<0.04 and 0<a≤0.02.
In Formula 1, 0.001≤x≤0.01 and 0.005≤a≤0.015.
The lithium cobalt composite oxide may include
$Li_{0.9925}Mg_{0.005}CoO_{1.99}F_{0.01}$,
$Li_{0.99325}Mg_{0.00675}CoO_{1.9875}F_{0.0125}$,
$Li_{0.9925}Mg_{0.0075}CoO_{1.985}F_{0.015}$,
$Li_{0.995}Mg_{0.005}CoO_{1.995}F_{0.00005}$,
$Li_{0.99325}Mg_{0.00675}CoO_{1.99325}F_{0.00675}$,
$Li_{0.9925}MgO_{0.0075}CoO_{1.9925}F_{0.0075}$,
$Li_{0.99}Mg_{0.01}CoO_{1.99}F_{0.01}$, or $Li_{0.99}Mg_{0.01}CoO_{1.98}F_{0.02}$.

The atomic ratio of Mg to Co of the lithium cobalt composite oxide may be about 0.005:1 to about 0.0075:1.

The embodiments may be realized by providing a lithium secondary battery, comprising a positive electrode including a lithium cobalt composite oxide, the lithium cobalt composite oxide including a magnesium (Mg)-doped lithium cobalt composite oxide having an atomic ratio of Mg to cobalt (Co) of about 0.0035:1 to about 0.01:1, wherein the Mg-doped lithium cobalt composite oxide further includes fluorine (F).

The lithium secondary battery may have a charging voltage of about 4.5 V or higher.

An amount of F in the lithium cobalt composite oxide may be about 0.2 mol % to about 2 mol %, based on a total number of moles of the lithium cobalt composite oxide.

The F may be doped inside the Mg-doped lithium cobalt composite oxide.

The atomic ratio of Mg to Co may be about 0.005:1 to about 0.01:1.

An atomic ratio of a sum of atoms of Li and Mg to Co may be about 1.00:1 or less.

The lithium cobalt composite oxide may be a compound represented by Formula 1 below:

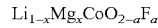   <Formula 1> wherein, in Formula 1, 0<x<0.04 and 0<a≤0.02.
In Formula 1, 0.001≤x≤0.01 and 0.005≤a≤0.015.
The lithium cobalt composite oxide may include
$Li_{0.995}Mg_{0.005}CoO_{1.99}F_{0.01}$,
$Li_{0.99325}Mg_{0.00675}CoO_{1.9875}F_{0.0125}$,
$Li_{0.9925}Mg_{0.0075}CoO_{1.985}F_{0.015}$,
$Li_{0.995}Mg_{0.005}CoO_{1.995}F_{0.005}$,
$Li_{0.99325}Mg_{0.00675}CoO_{1.99325}F_{0.00675}$,
$Li_{0.9925}Mg_{0.00075}CoO_{1.9925}F_{0.0075}$,
$Li_{0.99}Mg_{0.01}CoO_{1.99}F_{0.01}$, or $Li_{0.99}Mg_{0.01}CoO_{1.98}F_{0.02}$.

The atomic ratio of Mg to Co of the lithium cobalt composite oxide may be about 0.005:1 to about 0.0075:1.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
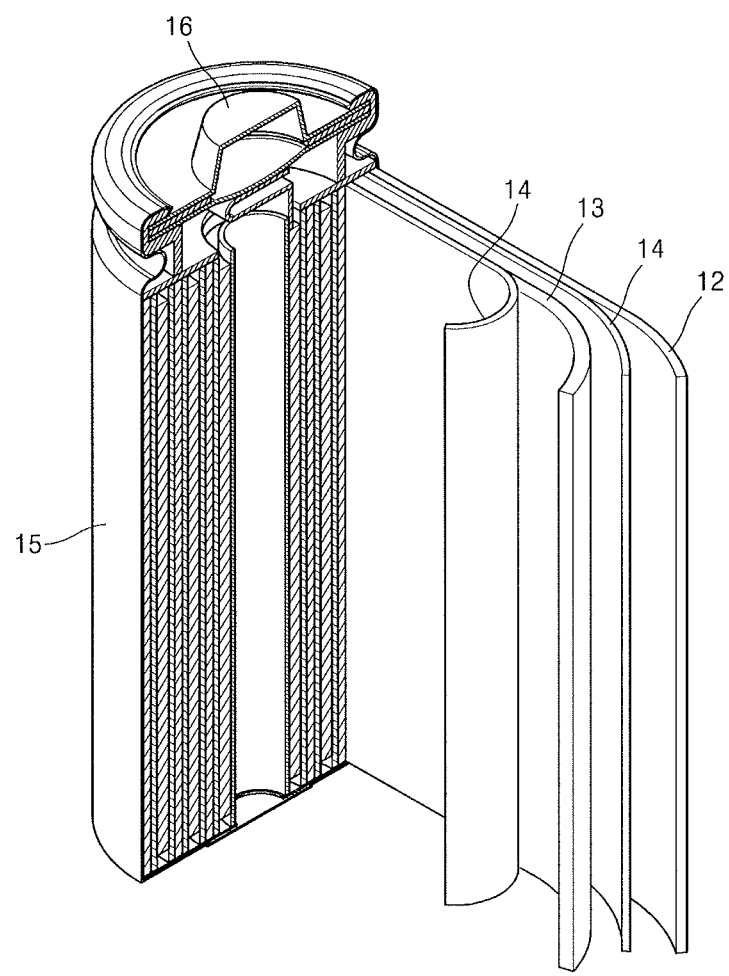
FIG. 1 illustrates a schematic view of a structure of a lithium secondary battery according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, lithium cobalt composite oxides according to example embodiments and lithium secondary batteries including positive electrodes including the same will be described in more detail.

According to an example embodiment, a lithium cobalt composite oxide for a lithium secondary battery may include a magnesium (Mg)-doped lithium cobalt composite oxide having an atomic ratio of Mg to Co of about 0.0035 to about 0.01 (e.g., about 0.0035:1 to about 0.01:1). The Mg-doped lithium cobalt composite oxide may further include fluorine (F).

The atomic ratio of Mg to Co may be, e.g., from about 0.004:1 to about 0.01:1.

When lithium cobalt oxide ($LiCoO_2$) is used as a positive electrode active material, a phase transition of $O_3$ to $H_{1-3}$ to $O_1$ may occur in a high voltage region. When such lithium cobalt oxide having gone through the phase transition is used as a positive electrode active material in a lithium secondary battery, cell performance of the lithium secondary battery may deteriorate.

The phase transition of $O_3 \rightarrow H_{1-3} \rightarrow O_1$ occurring in a high voltage region may be effectively suppressed by a lithium cobalt composite oxide doped with Mg, having an atomic ratio of Mg to Co of about 0.004:1 to about 0.01:1, and also including F. As a result, when such a lithium cobalt composite oxide is used, high-voltage stability may be enhanced, resulting in enhancement of charge and discharge capacities as well as enhanced lifespan characteristics of a lithium secondary battery at a high voltage. The high voltage region may be, e.g., about 4.5 V or higher, or from about 4.55 V to about 4.63 V.

The F element may be included in the lithium cobalt composite oxide. The F element may be disposed on a surface of the Mg-doped lithium cobalt composite oxide or in a state mixed with the Mg-doped lithium cobalt composite oxide. In the latter case, the Mg-doped lithium cobalt composite oxide may be surface-treated with the F element in an anion form to produce a compound having the formula $(Li_{1-x}Mg_x)CoO_{2-a}F_a$.

The amount of F may be from about 0.4 mol % to about 2 mol %, based on a total number of moles of the lithium cobalt composite oxide. When the amount of F is within the above range, the phase transition at a high voltage may be suppressed and, accordingly, a lithium cobalt composite oxide with enhanced stability may be obtained.

According to one example embodiment, the F element may be doped inside the Mg-doped lithium cobalt composite oxide.

In an implementation, the atomic ratio of Mg to Co may be, e.g., from about 0.005:1 to about 0.0075:1. In an implementation, an atomic ratio of F to Mg may be, e.g., from about 1:1 to about 2:1.

In an implementation, an atomic ratio of a sum of Li and Mg to Co may be about 1.00:1 or less, e.g., from about 0.96:1 to about 1.00:1. When the atomic ratio of a sum of Li and Mg to Co is within the above ranges, a lithium cobalt composite oxide having a strong phase transition-suppressing ability may be obtained.

The lithium cobalt composite oxide may be a compound represented by Formula 1 below:

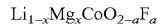    <Formula 1>

In Formula 1, 0<x<0.04 and 0<a≤0.02.

As shown in Formula 1 above, the lithium cobalt composite oxide may have a structure in which Mg is included in an amount of about 4 mol % or less, doped in the Li site, and F may be included in an amount of about 2 mol % or less, doped in the O site. When the amount of Mg is about 4 mol % or more, Mg may be doped in the Co site.

In Formula 1 above, x may be 0.001 to 0.01, e.g., 0.005, 0.00625, 0.0075, or 0.001. In addition, a may be 0.001 to 0.2, e.g., 0.005 to 0.015. For example, a may be 0.005, 0.0075, 0.01, 0.0125, or 0.015.

The lithium cobalt composite oxide may be, e.g., $Li_{0.995}Mg_{0.005}CoO_{1.99}F_{0.01}$, $Li_{0.99325}Mg_{0.00675}CoO_{1.9875}F_{0.0125}$, $Li_{0.9925}Mg_{0.0075}CoO_{1.985}F_{0.0015}$, $Li_{0.9925}Mg_{0.005}CoO_{1.995}F_{0.005}$, $Li_{0.99325}Mg_{0.00675}CoO_{1.99325}F_{0.00675}$, $Li_{0.9925}Mg_{0.0075}CoO_{1.9925}F_{0.0075}$, $Li_{0.99}Mg_{0.01}CoO_{1.99}F_{0.01}$, or $Li_{0.99}Mg_{0.01}CoO_{1.98}F_{0.02}$.

In the lithium cobalt composite oxide, as shown in Formula 1 above, Mg ions may be present in a space in a Li layer thereof and thus, although all the Li ions may be removed from the Li layer, a 03-type structure of the lithium cobalt composite oxide may be more stable in a high voltage region. As such, Mg may be doped in the Li site of the Li layer, and Mg may act as a support, enhancing structural stability, even though Li ions may be removed from the layered structure. For example, the 03-type structure may have a high stability at a high voltage of about 4.5 V or higher.

The lithium cobalt composite oxide may include F, and some sites of O atoms may be substituted with F. Thus, an average oxidation number of Co ions may be decreased from +4 by a number of moles of the substituted F and an oxidation number of Co on a surface of the lithium cobalt composite oxide may be further decreased. As such, the decrease in the average oxidation number of Co ions may facilitate enhanced structural stability of the lithium cobalt composite oxide. In addition, ion binding properties may be enhanced by Co—F bonding and thus $O_2$ gas generation and Co elution may be suppressed, thereby enhancing chemical stability of LCO.

In an implementation, the lithium cobalt composite oxide may be further doped with at least one selected from, e.g., titanium, aluminum, manganese, zirconium, sodium, potassium, calcium, and zinc.

Hereinafter, a method of preparing the lithium cobalt composite oxide, according to an example embodiment will be described.

First, a Li precursor, a Co precursor, a Mg precursor, and a F precursor may be mixed in a predetermined molar ratio to obtain a precursor mixture. In this regard, a mixing ratio of the Li precursor, the Co precursor, the Mg precursor, and the F precursor may be stoichiometrically controlled to obtain a desired lithium cobalt composite oxide.

The mixing process may be, e.g., dry mixing such as mechanical mixing using a ball mill, a Banbury mixer, a homogenizer, or the like. The mechanical mixing may be performed using zirconia balls or the like. The mechanical mixing time may vary, e.g., from about 20 minutes to about 10 hours, or from 30 minutes to about 3 hours.

Dry mixing may lower manufacturing costs relative to wet mixing.

In the mechanical mixing process, wet mixing may be performed using a solvent, e.g., an alcohol such as ethanol, or the like, to thereby increase mixing efficiency of the precursor mixture.

The amount of the solvent may be from about 100 parts by weight to about 3,000 parts by weight based on a total amount (100 parts by weight) of the precursors. When the amount of the solvent is within the above range, a mixture with the precursors uniformly dissolved therein may be obtained. Heat treatment may be performed for an amount of time that may vary depending upon a heat treatment temperature. e.g., from about 3 hours to about 20 hours.

The lithium cobalt composite oxide may be prepared using a suitable preparation method, e.g., by spray pyrolysis or the like, in addition to the solid phase method described above.

The mixture may be heat-treated under an air or oxygen atmosphere to obtain a lithium cobalt composite oxide.

In an implementation, the heat treatment process may be performed under an air or oxygen atmosphere at a temperature ranging from about 400° C. to about 1,200° C., e.g., about 900° C. to about 1100° C. In this regard, the oxygen atmosphere may be formed using oxygen alone or a combination of oxygen, nitrogen, and an inert gas.

The heat treatment time may vary according to the heat treatment temperature. For example, the heat treatment time may be from about 5 hours to about 20 hours.

Examples of the Li precursor may include lithium hydroxide (LiOH), lithium carbonate ($Li_2CO_3$), lithium sulfate ($Li_2SO_4$), and lithium nitrate ($LiNO_3$).

Examples of the Co precursor may include cobalt carbonate, cobalt hydroxide, cobalt chloride, cobalt sulfate, and cobalt nitrate. Examples of the Mg precursor may include magnesium chloride, magnesium carbonate, magnesium hydroxide, magnesium sulfate, magnesium nitrate, and magnesium fluoride.

The F precursor may include, e.g., magnesium fluoride or the like.

In an implementation, the Li, Co, Mg, and F precursors may include suitable Li, Co, Mg and F precursors.

The lithium cobalt composite oxide obtained using the preparation method described above may have, eg., a specific surface area of about 0.1 m²/g to about 3 m²/g and an average particle diameter of about 1 m to about 20 μm. The average particle diameter may be measured according to standard techniques, such as those described in standard ISO 9276. Average particle diameter may be measured by particle size analyzer (USA), and the specific surface area may be measured by BET method.

According to another aspect of an embodiment, provided is a lithium secondary battery including a positive electrode including the lithium cobalt composite oxide.

First, a positive electrode may be prepared in the following manner.

For example, a lithium cobalt composite oxide according to an embodiment as a positive electrode active material, a binder, and a solvent may be mixed to prepare a positive electrode active material composition.

In an implementation, a conducting agent may be further included in the positive electrode active material composition.

In an implementation, the positive electrode active material composition may be directly coated and dried on a metallic current collector to prepare a positive electrode plate. In an implementation, the positive electrode active material composition may be cast on a separate support to form a positive electrode active material film, which may then be separated from the support and laminated on a metallic current collector to prepare a positive electrode plate.

The positive electrode may further include a first positive electrode active material, which is a suitable positive electrode active material in a lithium secondary battery, during preparation of the positive electrode plate.

The first positive electrode active material may further include, e.g., at least one selected from lithium cobalt oxide, lithium nickel cobalt manganese oxide, lithium nickel cobalt aluminum oxide, lithium iron phosphate oxide, and lithium manganese oxide, and a suitable positive electrode active material may be used.

In an implementation, the positive electrode active material may be a compound represented by any of following formulas: $Li_aA_{1-b}R_bD_2$ (where, $0.90 \le a \le 1.8$, and $0 \le b \le 0.5$); $Li_aE_{1-b}R_bO_{2-c}D_c$ (where $0.90 \le a \le 1.8$, $0 \le b \le 0.5$, and $0 \le c \le 0.05$); $LiE_{2-b}RbO_{4-c}D_c$ (where $0 \le b \le 0.5$ and $0 \le c \le 0.05$); $Li_aNi_{1-b-c}Co_bR_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bR_cO_{2-\alpha}X_\alpha$ (where $0.90 \le a \le 1.8$, $0 \le b \le 0.5$, $0 \le c \le 0.05$, and $0 < \alpha < 2$); $Li_aNi_{1-b-c}Co_bR_cO_{2-\alpha}X_2$ (where $0.90 \le a \le 1.8$, $0 \le b \le 0.5$, $0 \le c \le 0.05$, and $0 < \alpha < 2$); $Li_aNi_{1-b-c}Mn_bR_cD_\alpha$ (where $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}X_\alpha$ (where $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}X_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$ and $0.001 \le b \le 0.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiM'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the above formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof: E may be Co, Mn, or a combination thereof; X may be F, S, P, or a combination thereof: G may be Al, Cr, Mn, Fe, Mg, La, Ce, Sr, V, or a combination thereof; Q may be Ti, Mo, Mn, or a combination thereof; M' may be Cr, V, Fe, Sc, Y, or a combination thereof; and J may be V, Cr, Mn, Co, Ni, Cu, or a combination thereof.

In the positive electrode active material composition, the binder may include, e.g., polyamideimide, polyacrylic acid ("PAA"), polyvinylidene fluoride, polyvinyl alcohol, carboxymethylcellulose ("CMC"), starch, hydroxypropyl cellulose, regenerated cellulose, polyvinylpyrrolidone, tetrafluoroethylene, polyethylene, polypropylene, polystyrene, lithium polyacrylate, lithium polymethacrylate, ethylene-propylene-diene monomer ("EPDM"), sulfonated EPDM, styrene butadiene rubber, fluoride rubber, or various polymers.

In an implementation, the conducting agent may include at least one carbonaceous material selected from carbon black, carbon fibers, and graphite. In an implementation, the carbon black may be selected from acetylene black, Ketjen black, super P, channel black, furnace black, lamp black, and thermal black.

The graphite may be natural graphite or artificial graphite.

The solvent may be at least one selected from N-methylpyrrolidone, butanol, acetonitrile, acetone, methanol, ethanol, or N-methyl-2-pyrrolidone (NMP), or a suitable solvent may be used.

In an implementation, a plasticizer may be further added to the positive electrode active material composition and/or negative electrode active material composition to help form pores in the electrode plate.

Amounts of the positive electrode active material, the conducting agent, the binder, and the solvent may be in ranges that are suitably used in lithium batteries. In an implementation, at least one of the conducting agent, the binder, and the solvent may be omitted according to the use and the structure of the lithium battery.

The negative electrode may be prepared by using the same method used to prepare the positive electrode, except that a negative electrode active material may be used instead of the positive electrode active material in the preparation of the positive electrode.

The negative electrode active material may be a carbonaceous material, silicon, a silicon oxide, a silicon-based alloy, a silicon-carbonaceous material composite, tin, a tin-based alloy, a tin-carbon composite, a metal oxide, or a combination thereof.

The carbonaceous material may be crystalline carbon, amorphous carbon, or a mixture thereof. Examples of the crystalline carbon may include graphite such as natural graphite or artificial graphite in non-shaped, plate-shaped, flake, spherical, or fibrous form, and examples of the amorphous carbon may include soft carbon (carbon sintered at low temperature), hard carbon, meso-phase pitch carbonization products, sintered coke, graphene, carbon black, fullerene soot, carbon nanotubes, or carbon fibers, or a suitable material available as a carbonaceous material in the art may be used.

The negative electrode active material may be selected from, e.g., Si, SiOx (where, $0<x<2$, or, for example, $0.5<x<1.5$), Sn, $SnO_2$, a silicon-containing metal alloy, and a mixture thereof. A metal for forming the silicon-containing metal alloy may include, e.g., at least one selected from Al, Sn, Ag, Fe, Bi, Mg, Zn, in, Ge, Pb. and Ti.

The negative electrode active material may include a metal/semi-metal alloyable with lithium, an alloy thereof, or an oxide thereof. Examples of the metal/metalloid alloyable with lithium, an alloy thereof, or an oxide thereof may include Si, Sn, Al, Ge, Pb, Bi, Sb, a Si—Y' alloy (where, Y' is an alkali metal, an alkali earth metal, a Group 13 element, a Group 14 element, a transition metal, a rare-earth element, or a combination thereof, but not Si), a Sn—Y' alloy (where, Y' is an alkali metal, an alkali earth metal, a Group 13 element, a Group 14 element, a transition metal, a rare-earth element, or a combination thereof, but not Sn), and $MnO_x$ (where, $0<x\le2$). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. Examples of the oxide of the metal/metalloid alloyable with lithium may include a lithium titanium oxide, a vanadium oxide, a lithium vanadium oxide, $SnO_2$, and $SiO_x$ (where, $0<x<2$).

The negative electrode active material may include, e.g., at least one selected from Group 13 elements, Group 14 elements, and Group 15 elements.

The negative electrode active material may include, e.g., at least one selected from Si, Ge, and Sn.

In the negative electrode active material composition, the conducting agent, the binder, and the solvent may be the same with those used in preparation of the positive electrode active material composition. Also, amounts of the negative electrode active material, the conducting agent, the binder, and the solvent used herein may be in ranges that are suitably used in lithium batteries.

A separator may be disposed between the positive electrode and the negative electrode, and the separator may be an insulating thin film having a high ion permeability and a high mechanical strength.

A pore diameter of the separator may be in a range of about 0.01 μm to about 10 μm, and a thickness of the separator may be in a range of about 5 μm to about 20 μm. The separator may be, e.g., an olefin-based polymer such as polypropylene; or a sheet or non-woven fabric formed of glass fibers or polyethylene. When a solid polymer electrolyte is used as the electrolyte, the solid polymer electrolyte may serve as a separator at the same time.

In an implementation, the separator may have a multi-layer structure including at least two layers of polyethylene, polypropylene, or polyvinylidene fluoride, and a mixed multi-layer structure may be used, wherein examples of the mixed multi-layer structure may include a two-layer separator of polyethylene/polypropylene, a three-layer separator of polyethylene/polypropylene/polyethylene, and a three-layer separator of polyprolyene/polyethylene/polypropylene.

A lithium salt-containing non-aqueous based electrolyte solution may include a non-aqueous electrolyte and a lithium salt.

Examples of the non-aqueous electrolyte may include a non-aqueous electrolyte solution, an organic solid electrolyte, and an inorganic solid electrolyte.

The non-aqueous electrolyte solution may include an organic solvent, which may be a suitable material available as an organic solvent. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, dimethyl ether, or a mixture thereof.

Examples of the organic solid electrolyte may include polyethylene derivatives, polyethylene oxide derivatives, polypropylene oxide derivatives, phosphoric acid ester polymers, polyester sulfide, polyvinyl alcohols, and polyvinylidene fluoride.

Examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be soluble in the non-aqueous electrolyte. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are a natural number), LiCl, LiI, or a mixture thereof. In an implementation, in order to help improve charging/discharging characteristics or flame resistance of the electrolyte, e.g., the non-aqueous electrolyte may further include pyridine, triethylphosphite, triethanolamine, cyclic ether, ethylenediamine, n-glyme, hexamethyl phosphoramide, nitrobenzene derivatives, sulfur, quinone imide dyes, N-substituted oxazolidinone, N,N-substituted imidazolidine, ethyleneglycol dialkylether, ammonium salts, pyrrole, 2-methoxyethanol, or aluminum trichloride. In an implementation, in order to help impart incombustibility, the electrolyte may further include a halogen-containing solvent such as carbon tetrachloride or ethylene trifluoride.

As shown in FIG. 1, a lithium secondary battery may include a positive electrode 13, a negative electrode 12, and a separator 14. The positive electrode 13, the negative electrode 12, and the separator 14 may be wound and/or folded to be accommodated in a battery case 15. Then, an organic electrolyte solution may be injected into the battery case 15, and the battery case 15 may be sealed with a cap assembly 16, thereby completing the manufacture of the lithium battery. The battery case 15 may have a shape of, e.g., a cylinder, a box, or a film.

A battery assembly may be prepared by disposing a separator between a positive electrode and a negative electrode. A plurality of the battery assemblies may be stacked in a bi-cell structure and impregnated with an organic electrolyte solution. The resultant may then be put into a pouch and sealed, thereby completing the manufacture of a lithium ion polymer battery.

In an implementation, a plurality of the battery assemblies may be stacked to form a battery pack, which may be used in a suitable device that requires high capacity and high output, e.g., in a laptop computer, a smartphone, or an electric vehicle.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Lithium carbonate as a Li precursor, cobalt oxide as a Co precursor, magnesium carbonate as a Mg precursor, and magnesium fluoride or lithium fluoride as a F precursor were subjected to dry mixing in a Henschel mixer for about 3 minutes to obtain a mixture having a molar ratio of Li:Co:Mg:F:O of 0.9925:1.00:0.0075:0.015:1.985. The mixture was heat-treated in an air atmosphere at about 1,000° C. for about 10 hours, and the heat-treated product was pulverized and classified to obtain a lithium cobalt-based composite oxide ($Li_{0.9925}Mg_{0.0075}CoO_{1.985}F_{0.0015}$) as a positive electrode active material.

Example 2

A lithium cobalt-based composite oxide ($Li_{0.995}Mg_{0.005}CoO_{1.99}F_{0.01}$) was obtained in the same manner as in Example 1, except that the mixing ratio of the Li precursor, the Co precursor, the Mg precursor, and the F precursor was changed so that the molar ratio of Li:Co:Mg:F:O was 0.995:1.00:0.005:0.01:1.99.

Example 3

A lithium cobalt-based composite oxide ($Li_{0.99325}Mg_{0.00675}CoO_{1.9875}F_{0.0125}$) was obtained in the same manner as in Example 1, except that the mixing ratio of the Li precursor, the Co precursor, the Mg precursor, and the F precursor was changed so that the molar ratio of Li:Co:Mg:F:O was 0.99325:1.00:0.00675:0.0125:1.9875.

Comparative Example 1

Lithium carbonate as a Li precursor and cobalt carbonate as a Co precursor were subjected to dry mixing in a Henschel mixer for about 3 minutes to obtain a mixture having a molar ratio of Li:Co:O of 1.00:1.00:2. The mixture was heat-treated in an air atmosphere at about 1,000° C. for about 10 hours, and the heat-treated product was pulverized and classified to obtain lithium cobalt oxide ($LiCoO_2$).

Comparative Example 2

A lithium cobalt-based composite oxide ($Li_{0.9975}Mg_{0.0025}CoO_{1.995}F_{0.005}$) was obtained in the same manner as in Example 1, except that the mixing ratio of the Li precursor, the Co precursor, the Mg precursor, and the F precursor was changed so that the molar ratio of Li:Co:Mg:F:O was 0.9975:1.00:0.0025:0.005:1.995.

Comparative Example 3

A lithium cobalt-based composite oxide ($Li_{0.99625}Mg_{0.0000375}CoO_{1.9925}F_{0.0075}$) was obtained in the same manner as in Example 1, except that the mixing ratio of the Li precursor, the Co precursor, the Mg precursor, and the F precursor was changed so that the molar ratio of Li:Co:Mg:F:O was 0.99625:1.00:0.00375:0.0075:1.9925.

Manufacture Example 1: Manufacture of Lithium Secondary Battery (Coin Half-Cell)

A coin half-cell was manufactured as follows using the positive electrode active material prepared according to Example 1.

A mixture of the positive electrode active material of Example 1, polyvinylidene fluoride, and carbon black as a conductive agent were uniformly dispersed using a mixer, with air bubbles removed therefrom, to prepare a slurry for forming a positive electrode active material layer. N-methylpyrrolidone as a solvent was added to the mixture, and a weight mixing ratio of the composite positive electrode active material, polyvinylidene fluoride, and carbon black was 92:4:4.

The slurry prepared according to the above processes was coated on aluminum foil using a doctor blade to thereby fabricate a thin plate, and the thin plate was dried at 135° C. for over 3 hours, followed by pressing and vacuum drying, to manufacture a positive electrode.

The positive electrode and Li metal electrode as a counter electrode were used to manufacture a 2032 coin half-cell. A separator (thickness: about 16 μm) composed of a porous polyethylene (PE) film was disposed between the positive electrode and the Li metal electrode, and an electrolyte was injected thereinto to manufacture a coin half-cell. As the electrolyte, a 1.1 M solution including $LiPF_6$ dissolved in a mixed solvent of ethylene carbonate (EC), ethyl methyl carbonate (EMC), and dimethyl carbonate (DMC) in a volume ratio of 3:4:3 was used.

Manufacture Examples 2 and 3: Manufacture of Coin Half-Cells

Coin half-cells were manufactured in the same manner as in Manufacture Example 1, except that the positive electrode active materials prepared according to Examples 2 and 3 were each used instead of the positive electrode active material of Example 1.

Comparative Manufacture Examples 1 to 3: Manufacture of Coin Half-Cells

Coin half-cells were manufactured in the same manner as in Manufacture Example 1, except that the positive electrode active materials prepared according to Comparative Examples 1 to 3 were each used instead of the positive electrode active material of Example 1.

Evaluation Example 1: Charge and Discharge Characteristics

1) Manufacture Examples 1 to 3 and Comparative Manufacture Examples 1 to 3

Charge and discharge characteristics of the coin half-cells manufactured according to Manufacture Examples 1 to 3 and Comparative Manufacture Examples 1 to 3 were evaluated using a charger/discharger.

In the $1^{st}$ charging/discharging cycle, charging was performed at a constant current of 0.1 C until the voltage reached 4.6 V. The completely charged coin half-cells were rested for about 10 minutes, and then each coin half-cell was discharged at a constant current of 0.1 C until the voltage reached 3 V. In the $2^{nd}$ charging/discharging cycle, each coin half-cell was charged at a constant current of 0.2 C until the voltage reached 4.6 V. The completely charged coin half-cells were rested for about 10 minutes, and then each coin half-cell was discharged at a constant current of 0.2 C until the voltage reached 3 V.

Figure 2:
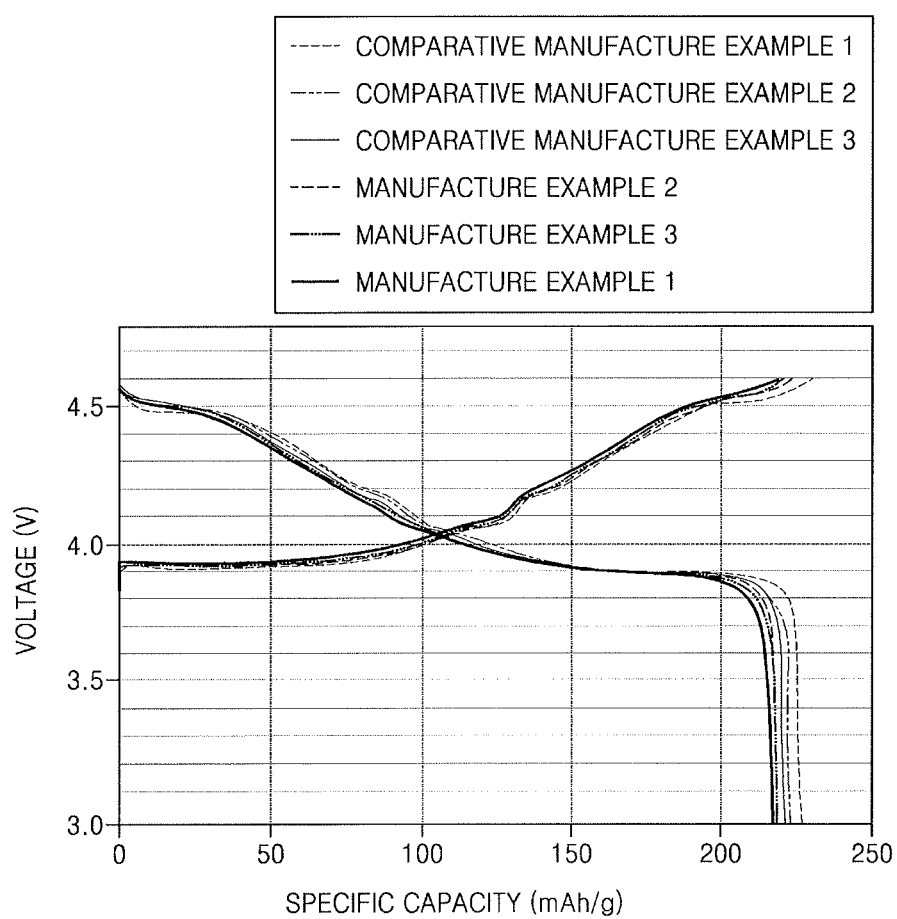
FIG. 2 illustrates a graph showing voltage profiles of coin half-cells manufactured according to Manufacture Examples 1 to 3 and Comparative Manufacture Examples 1 to 3.

From the charge/discharge characteristics evaluation described above, results of the changes in voltage according to specific capacity are shown in FIG. 2.

From the results shown in FIG. 2, it may be seen that an increase in doping amounts of Mg and F resulted in a decrease in specific capacity.

Evaluation Example 2: Differential Capacity Curve (dQ/dV)

Each of the lithium secondary batteries of Manufacture Examples 1 to 3 and Comparative Manufacture Examples 1 to 3 was charged at a constant current of 0.1 C rate until the voltage reached 4.6 V (vs. Li). Subsequently, each lithium secondary battery was discharged at a constant current of 0.1 C until the voltage reached 3.0 V (vs. Li) (formation operation, $1^{st}$ cycle).

Each lithium secondary battery after the formation operation was charged at a constant current of 0.2 C at 25° C. until the voltage reached 4.6 V (vs. Li). Subsequently, each lithium secondary battery was discharged at a constant current of 0.2 C until the voltage reached 3.0 V (vs. Li), and dQ/dV profiles of the lithium secondary batteries were compared with one another.

Figure 3A:
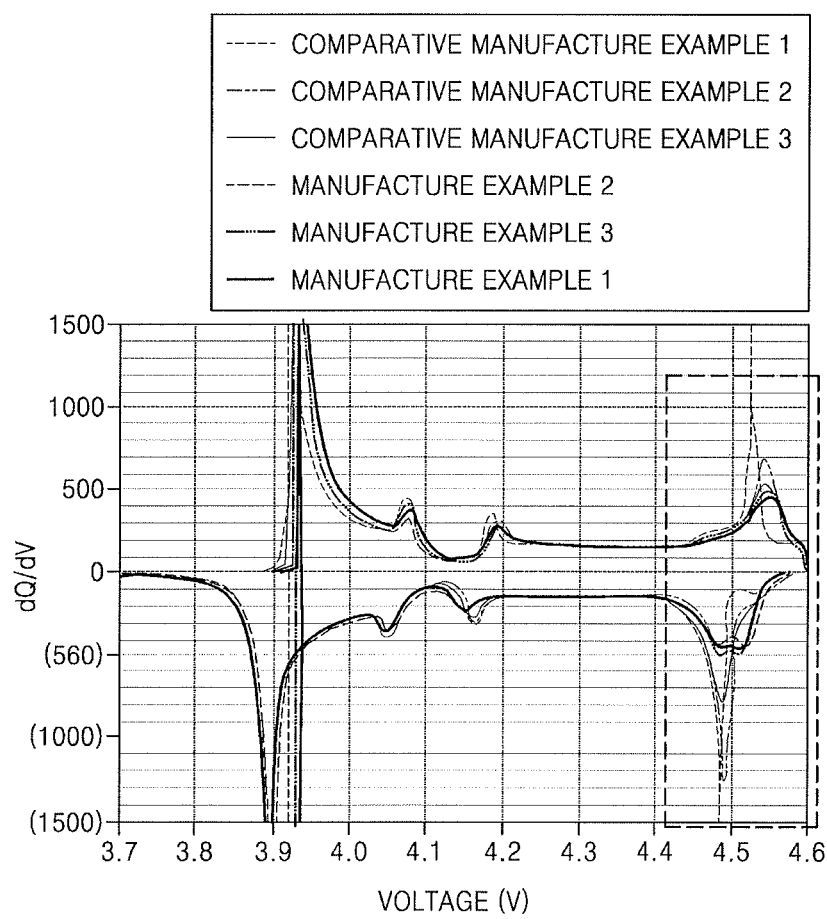
FIGS. 3A and 3B illustrate graphs showing differential capacity curves of the coin half-cells of Manufacture Examples 1 to 3 and Comparative Manufacture Examples 1 to 3.
Figure 3B:
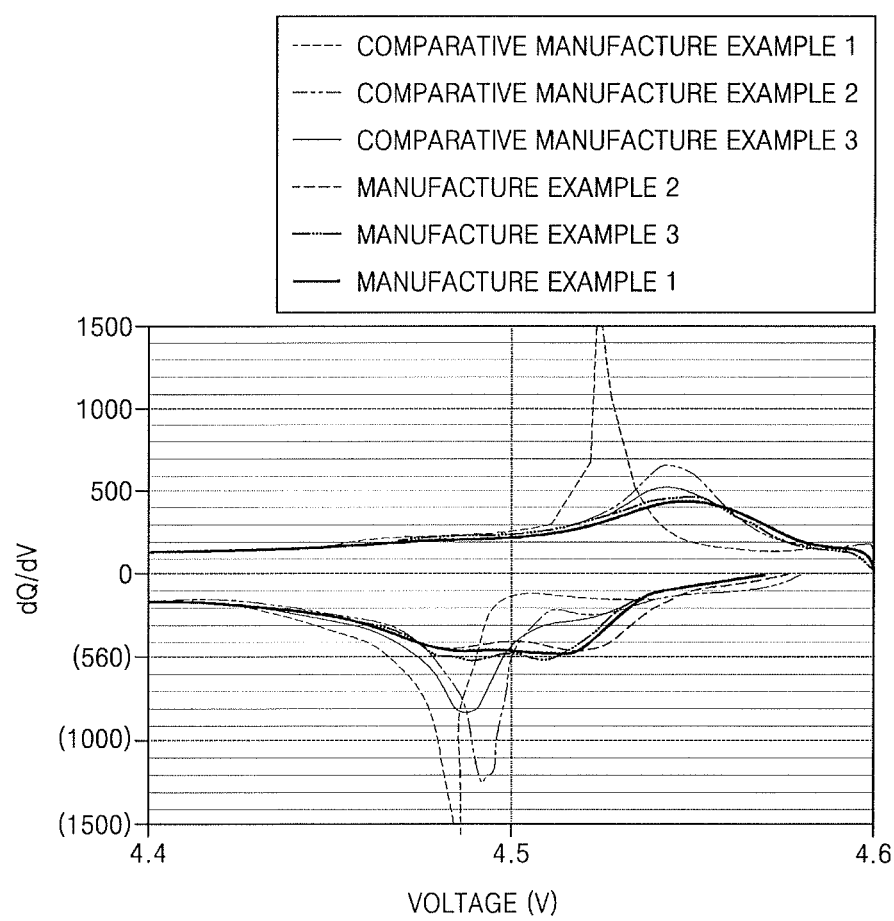

Differential capacity characteristics of the lithium secondary batteries after the cycles described above were evaluated and the results thereof are shown in FIGS. 3A and 3B. FIG. 3B illustrates an enlarged view of a rectangular area represented by a dotted line of FIG. 3A.

Referring to FIGS. 3A and 3B, the lithium secondary batteries of Manufacture Examples 1 to 3 had a smaller intensity at a peak representing a phase transition of $O_3 \rightarrow H_{1-3} \rightarrow O_1$ during charging than that of the lithium secondary batteries of Comparative Manufacture Examples 1 to 3. In addition, during discharging, reversibility of the phase transition of $O_1 \rightarrow H_{1-3} \rightarrow O_3$ was enhanced. In addition, it may be seen that, when doping amounts of Mg and F were 0.5 mol % and 1 mol % or more, respectively, optimum phase transition properties were obtained.

Evaluation Example 3: Cycle Characteristics

1) Manufacture Examples 1 to 3 and Comparative Manufacture Examples 1 to 3

Charge/discharge characteristics of the coin half-cells of Manufacture Examples 1 to 3 and Comparative Manufacture Examples 1 to 3 were evaluated using a charger/discharger under the following conditions.

In the 1st charging/discharging cycle, each coin half-cell was charged at a constant current of 0.1 C until the voltage reached 4.6 V. The completely charged coin half-cells were rested for about 10 minutes, and then each coin half-cell was discharged at a constant current of 0.1 C until the voltage reached 3 V. In the $2^{nd}$ charging/discharging cycle, each coin half-cell was charged at a constant current of 0.2 C until the voltage reached 4.6 V. The completely charged coin half-cells were rested for about 10 minutes and then were discharged at a constant current of 0.2 C until the voltage reached 3 V.

To evaluate a lifespan of each coin half-cell, each coin half-cell was charged at a constant current of 1 C until the voltage reached 4.6 V. The completely charged coin half-cells were rested for about 10 minutes and were then discharged at a constant current of 1 C until the voltage reached 3 V. This cycle of charging and discharging was repeated 50 times.

Figure 4:
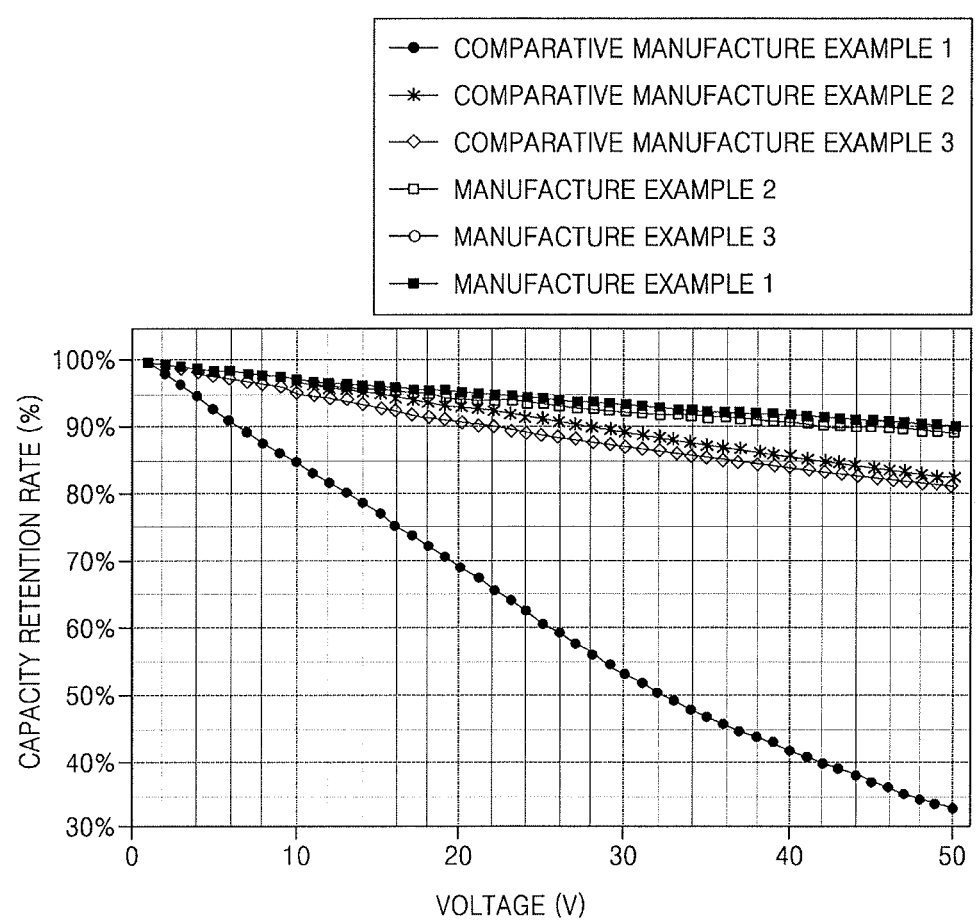
FIG. 4 illustrates a graph showing lifespan characteristics of the coin half-cells of Manufacture Examples 1 to 3 and Comparative Manufacture Examples 1 to 3.

The lifespan evaluation results are shown in FIG. 4.

From the results shown in FIG. 4, it may be seen that the lithium secondary batteries of Manufacture Examples 1 to 3 had longer lifespans than that of the lithium secondary batteries of Comparative Manufacture Examples 1 to 3.

By way of summation and review, research on performance improvement of $LiCoO_2$ has been actively ongoing to address capacity limitation and safety of $LiCoO_2$.

As is apparent from the foregoing description, in a lithium cobalt composite oxide according to an example embodiment, a phase transition may be effectively suppressed at a high voltage, thereby enhancing stability at a high voltage. In addition, a lithium secondary battery with enhanced charge/discharge and lifespan characteristics may be manufactured using the lithium cobalt composite oxide.

The embodiments may provide lithium secondary batteries using the lithium cobalt composite oxides and thus having enhanced stability at high voltages and enhanced cell performance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A lithium cobalt composite oxide for a lithium secondary battery,
wherein the lithium cobalt composite oxide is a compound represented by Formula 1 below, $$Li_{1-x}Mg_xCoO_{2-a}F_a \qquad \text{<Formula 1>}$$

wherein in Formula 1, $0.005 \leq x \leq 0.0075$ and $0 < a \leq 0.02$.

2. The lithium cobalt composite oxide as claimed in claim 1, wherein an amount of F in the lithium cobalt composite oxide is about 0.2 mol % to about 2 mol %, based on a total number of moles of the lithium cobalt composite oxide.

3. The lithium cobalt composite oxide as claimed in claim 1, wherein the F is doped inside the Mg-doped lithium cobalt composite oxide.

4. The lithium cobalt composite oxide as claimed in claim 1, wherein the atomic ratio of Mg to Co is about 0.005:1 to about 0.0075:1.

5. The lithium cobalt composite oxide as claimed in claim 1, wherein an atomic ratio of a sum of atoms of Li and Mg to Co is about 1.00:1 or less.

6. The lithium cobalt composite oxide as claimed in claim 1, wherein, in Formula 1, $0.005 \leq a \leq 0.015$.

7. The lithium cobalt composite oxide as chimed in claim 1, wherein the lithium cobalt composite oxide includes $Li_{0.995}Mg_{0.005}CoO_{0.99}F_{0.01}$, $Li_{0.99325}Mg_{0.00675}CoO_{1.9875}F_{0.0125}$, $Li_{0.9925}Mg_{0.0075}CoO_{1.9925}F_{0.0075}$, $Li_{0.99325}Mg_{0.00675}CoO_{1.99325}F_{0.00675}$, or $Li_{0.9925}Mg_{0.0075}CoO_{1.9925}F_{0.0075}$.

8. The lithium cobalt composite oxide as claimed in claim 1, wherein the atomic ratio of Mg to Co of the lithium cobalt composite oxide is about 0.005:1 to about 0.0075:1.

9. A lithium secondary battery, comprising a positive electrode including a lithium cobalt composite oxide, wherein the lithium cobalt composite oxide is a compound represented by Formula below:

$$Li_{1-x}Mg_xCoO_{2-a}F_a \qquad \text{<Formula 1>}$$

wherein, in Formula 1, $0.005 \leq x \leq 0.0075$ and $0 < a \leq 0.02$.

10. The lithium secondary battery as claimed in claim 9, wherein the lithium secondary battery has a charging voltage of about 4.5 V or higher.

11. The lithium secondary battery as claimed in claim 9, wherein an amount of in the lithium cobalt composite oxide is about 0.2 mol % to about 2 mol %, based on a total number of moles of the lithium cobalt composite oxide.

12. The lithium secondary battery as claimed in claim 9, wherein the F is doped inside the Mg-doped lithium cobalt composite oxide.

13. The lithium secondary battery as claimed in claim 9, wherein the atomic ratio of Mg to Co is about 0.005:1 to about 0.0075:1.

14. The lithium secondary battery as claimed in claim 9, wherein an atomic ratio of a sum of atoms of Li and Mg to Co is about 1.00:1 or less.

15. The lithium secondary battery as claimed in claim 9, wherein, in Formula 1, $0.005 \leq a \leq 0.015$.

16. The lithium secondary battery as claimed in claim 9, wherein the lithium cobalt composite oxide includes $Li_{0.995}Mg_{0.005}CoO_{1.99}F_{0.01}$, $Li_{0.99325}Mg_{0.00625}CoO_{1.9875}F_{0.0125}$, $Li_{0.9925}Mg_{0.0075}CoO_{1.985}F_{0.015}$, $Li_{0.995}Mg_{0.005}CoO_{1.995}F_{0.005}$, $Li_{0.99325}Mg_{0.00625}CoO_{1.99325}F_{0.00625}$, or $Li_{0.9925}Mg_{0.0075}CoO_{1.9925}F_{0.0075}$.

17. The lithium secondary battery as claimed in claim 9, wherein the atomic ratio of Ma to Co of the lithium cobalt composite oxide is about 0.005:1 to about 0.0075:1.

* * * * *